(12) United States Patent
Nelson et al.

(10) Patent No.: US 6,189,907 B1
(45) Date of Patent: Feb. 20, 2001

(54) TREADLE CART

(76) Inventors: Erdick Nelson; Clarice Nelson, both of 9 Horne St., Kingston, NY (US) 12401

( * ) Notice: Under 35 U.S.C. 154(b), the term of this patent shall be extended for 0 days.

(21) Appl. No.: 09/263,301

(22) Filed: Mar. 5, 1999

(51) Int. Cl.[7] .................................................. B62M 1/04
(52) U.S. Cl. ......................... 280/258; 280/253; 280/220
(58) Field of Search .................................... 280/220, 221, 280/251, 252, 253, 255, 258, 87.1, 87.041, 87.042, 11.201; 180/180, 181

(56) References Cited

U.S. PATENT DOCUMENTS

| | | | |
|---|---|---|---|
| 479,370 | * | 7/1892 | Keuser ................................ 280/1.186 |
| 1,445,472 | * | 2/1923 | Barr ...................................... 280/221 |
| 1,750,187 | * | 3/1930 | Miller et al. ......................... 280/221 |
| 1,998,293 | * | 4/1935 | Sweany ................................ 280/221 |
| 2,508,189 | * | 5/1950 | Pierce .................................. 280/221 |
| 3,285,618 | * | 11/1966 | Welch .............................. 280/11.115 |
| 3,362,723 | * | 1/1968 | Bretholz ............................... 280/221 |
| 4,861,054 | * | 8/1989 | Spital ................................... 280/221 |
| 4,915,403 | * | 4/1990 | Wild et al. ........................... 280/221 |
| 5,224,724 | * | 7/1993 | Greenwood ......................... 280/221 |
| 5,310,202 | * | 5/1994 | Goodspeed .......................... 280/221 |
| 5,839,737 | * | 11/1998 | Kruczek .......................... 280/11.115 |

FOREIGN PATENT DOCUMENTS

718022 * 1/1932 (FR) .................................... 280/252

* cited by examiner

Primary Examiner—J. J. Swann
Assistant Examiner—Michael Cuff (57) ABSTRACT

A treadle cart, having two axles, each axle having one of two pairs of wheels mounted on it, the treadle cart being powered by the pivoting motion of a treadle board which transfers the power from the pivoting of the treadle board through a drive means including a flexible elongated member with two ends that is attached to the under side of treadle board, each of the drive means rotating a power wheel which through a drive train turns a clutch housing, each clutch housing having a clutch rotor mounted in it, each of the pair of clutch rotors alternating in transmitting power to the base wheels of the treadle cart.

14 Claims, 8 Drawing Sheets

TREADLE CART

BACKGROUND OF THE INVENTION

1. Field of the Invention

The present invention relates to manually powered carts and in particular to a cart powered by a treadle board that pivots up and down.

2. Prior Art and Objects

Various riding carts are known and four-wheel carts and wagons are common toys and exercise devices. Skateboards are another commonly used device where four wheels are mounted on a board. Toy cars using foot operated pedals for power have been in existence for a long time. The use of a manually powered cart or wagon on which to ride has been enjoyed by virtually everyone.

The existing carts are frequently difficult to power. Some require a slope so as to be propelled by gravity. Others require substantial leg or arm strength to be propelled. On the other hand, the treadle cart, according to the present invention, uses the rider's weight to power the cart and does so through a substantial mechanical advantage. The operator or rider merely shifts his or her weight back and forth on the treadle board, thus using much of the rider's body weight first to push one end of the treadle board down and then to push the other end of the treadle board down. In this way, with good balance, a rider can develop speed and have substantial endurance.

Accordingly, it is an object of the present invention to provide a treadle cart that is powered by shifting body weight.

It is another object of the present invention to provide a cart that permits endurance for continued operation.

It is another object of the invention to provide a treadle cart that provides substantial mechanical advantage to provide both speed and ease of operation.

It is another object of the invention to provide a treadle cart that is durable.

Other objects and advantages of the present invention will become apparent to those of ordinary skill in the art as the description proceeds.

SUMMARY OF THE INVENTION

In accordance with the present invention, a four-wheel cart is provided. The four base wheels are mounted to rotate on a pair of axles mounted on a frame and to engage the ground. Above the frame, a treadle board is mounted to pivot at its midpoint on the frame. In this way, the treadle board may be moved up and down at each end. Along each side of the treadle cart is a drive means which is an elongated flexible member having two ends. The drive means may be a belt or a chain. The drive means extends from both ends of the treadle board and there is a drive means on both sides of the treadle cart. A drive train is activated by each drive means. A clutch unit is powered by each drive train so that when one drive means is powering the treadle cart and the other flexible drive means is being returned, the clutch unit on the side where the flexible drive means is being returned will slip. A brake mechanism and steering mechanism that is foot actuated is also preferably provided.

DETAILED DESCRIPTION OF THE PREFERRED EMBODIMENT

Figure 1:
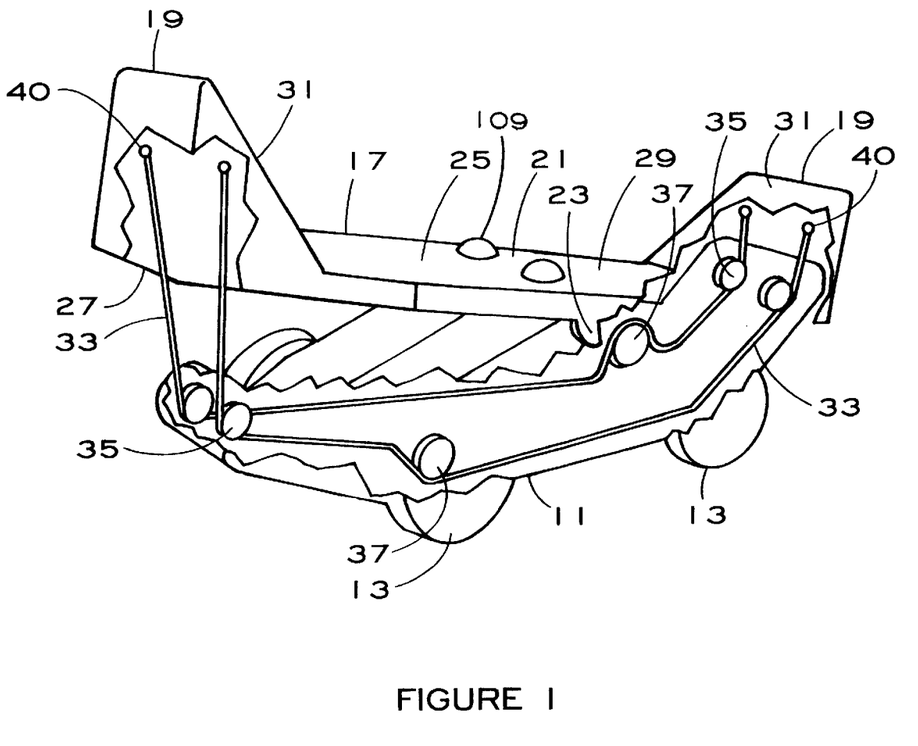
FIG. 1 is a pictorial view of the treadle cart partially broken away showing both of the pair of drive means and both pairs of idler wheels and both power wheels.
Figure 3:
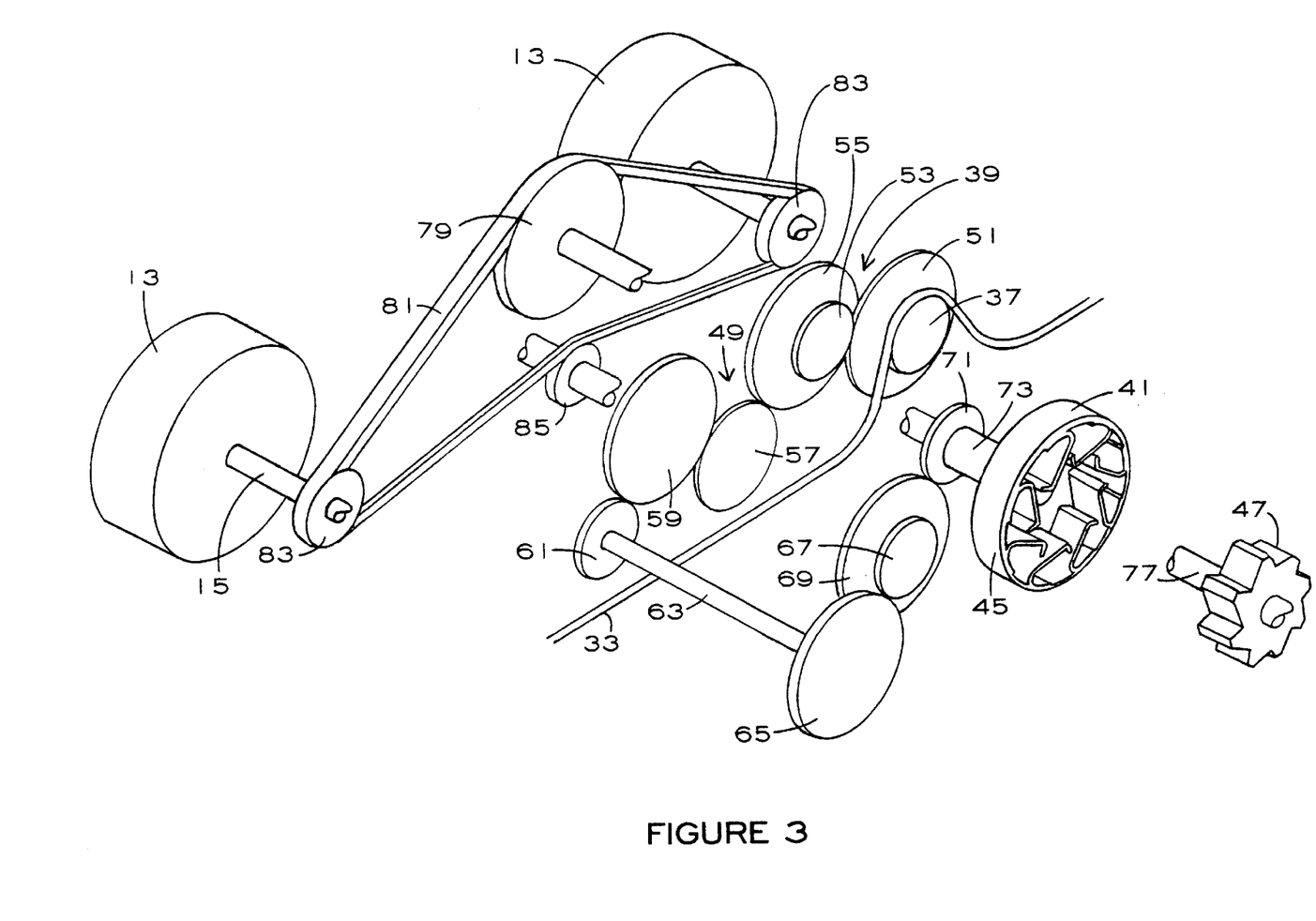
FIG. 3 is an exploded pictorial view of one of the pair of drive trains showing one of the drive means one drive train and a clutch unit and base wheels on one side of the treadle cart.
Figure 4:
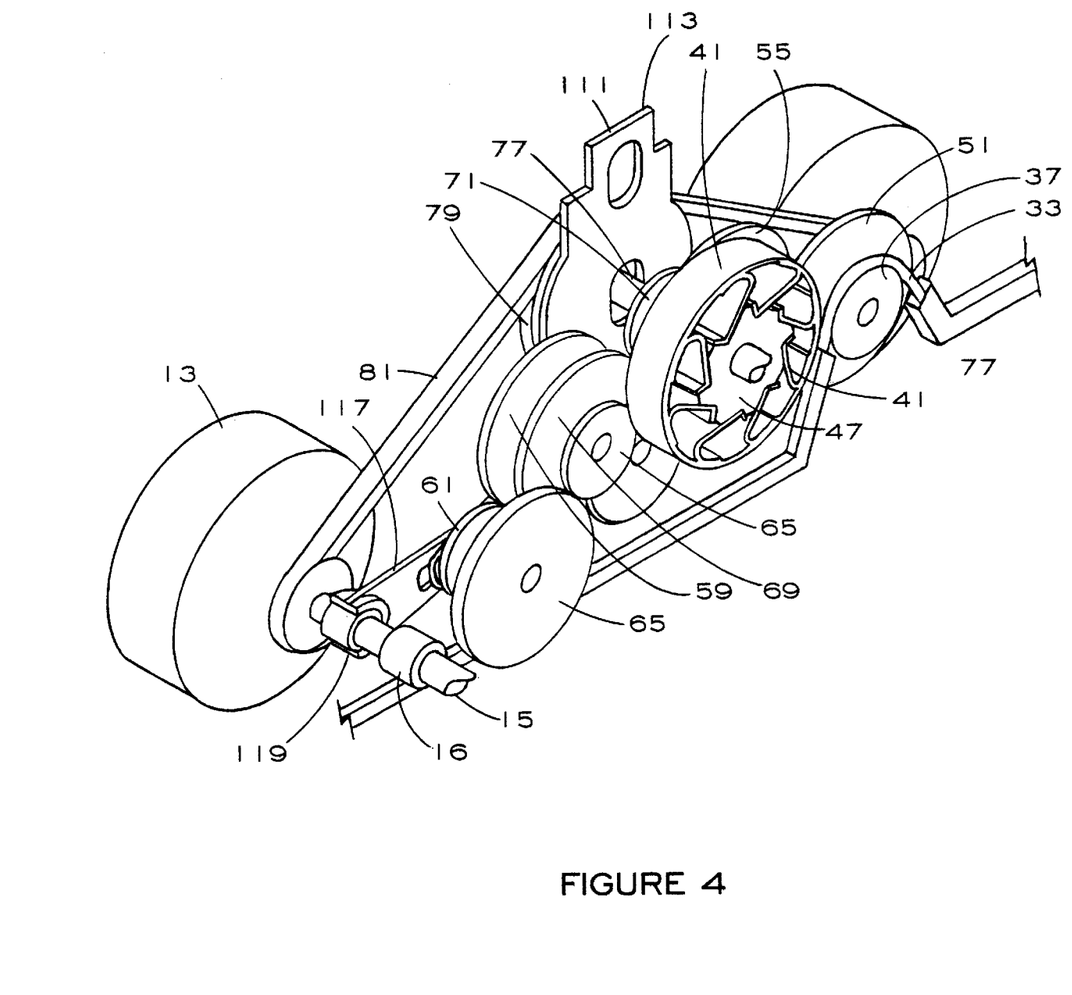
FIG. 4 is a pictorial view showing essentially the same portion of the treadle cart as shown in FIG. 3 but with the parts in proper relationship and also showing a part of one of the pair of brake and steering mechanisms.

Referring to FIG. 1 the basic concept of the treadle cart can be seen. The treadle cart is supported by a frame 11 and there are two pairs of base wheels 13 mounted on the frame 11. As best seen in FIG. 3, the base wheels 13 are intended to rest upon the ground and to rotate on a pair of axles 15 mounted on the frame 11. As best seen in FIG. 4, each of the axles 15 is split in the middle to facilitate steering as will be hereinafter explained. A journal 16, in which both axles 15 rotate, holds the split ends of the axles 15 together. As best seen in FIG. 1, a treadle board 17 is mounted to pivot up and down on the frame 11. The treadle board 17 is elongated, having two ends 19 and two sides 21, the ends 19 being substantially shorter than the sides 21 and generally at right angles to the sides 21. The treadle board 17 is mounted on the frame 11 at a point 23 generally midway between the two ends 19 so that the two ends 19 can go up and down on the frame 11. The treadle board 17 has a top surface 25 and an under surface 27. The top surface 25 has a center section 29 and two end sections 31. The end sections 31 are located at an obtuse angle to the center section 29 and provide a barrier at both ends 19 of the treadle board 17 for improved safety and also better leverage. An operator or rider stands upon the top surface 25, and by shifting his weight, causes the treadle board 17 to move up and down at each end 19. Still referring to FIG. 1, the drive means 33 are seen beneath both sides 21 of the treadle board 17. Both drive means 33 extend from one end 19 of the under surface 27 of the treadle board 17 to the under surface 27 of the other end 19 of the treadle board 17. Each drive means 33 has a pair of idler wheels 35 mounted on the frame 11 beneath opposite ends of the treadle board 17 to direct the drive means 33 along the frame 11 and to cause each drive means 33 to engage one of a pair of power wheels 37. One of a pair of drive trains 39 is best seen by referring to FIG. 3 and to FIG. 4. The pair of drive trains 39 is driven by a pair of power wheels 37.

In FIG. 1 the drive means 33 is a flexible elongated member with two ends 40 and may be a belt or a chain. A chain provides a positive drive and is preferred. However, a belt provides a quieter and lighter drive means 33.

In FIG. 1, it is clear that as the treadle board 17 moves up and down, the drive means 33 moves back and forth and each drive means 33 engages a power wheel 37 which powers the drive train 39. As best seen in FIG. 3 and FIG. 4, the power originated by moving the treadle board 17 up and down is supplied from the treadle board 17 by each drive means to the power wheels 37 and through the drive trains 39 to a pair of clutch units 41 and then to the base wheels 13, thereby causing the treadle cart to be propelled on the base wheels 13.

Figure 2:
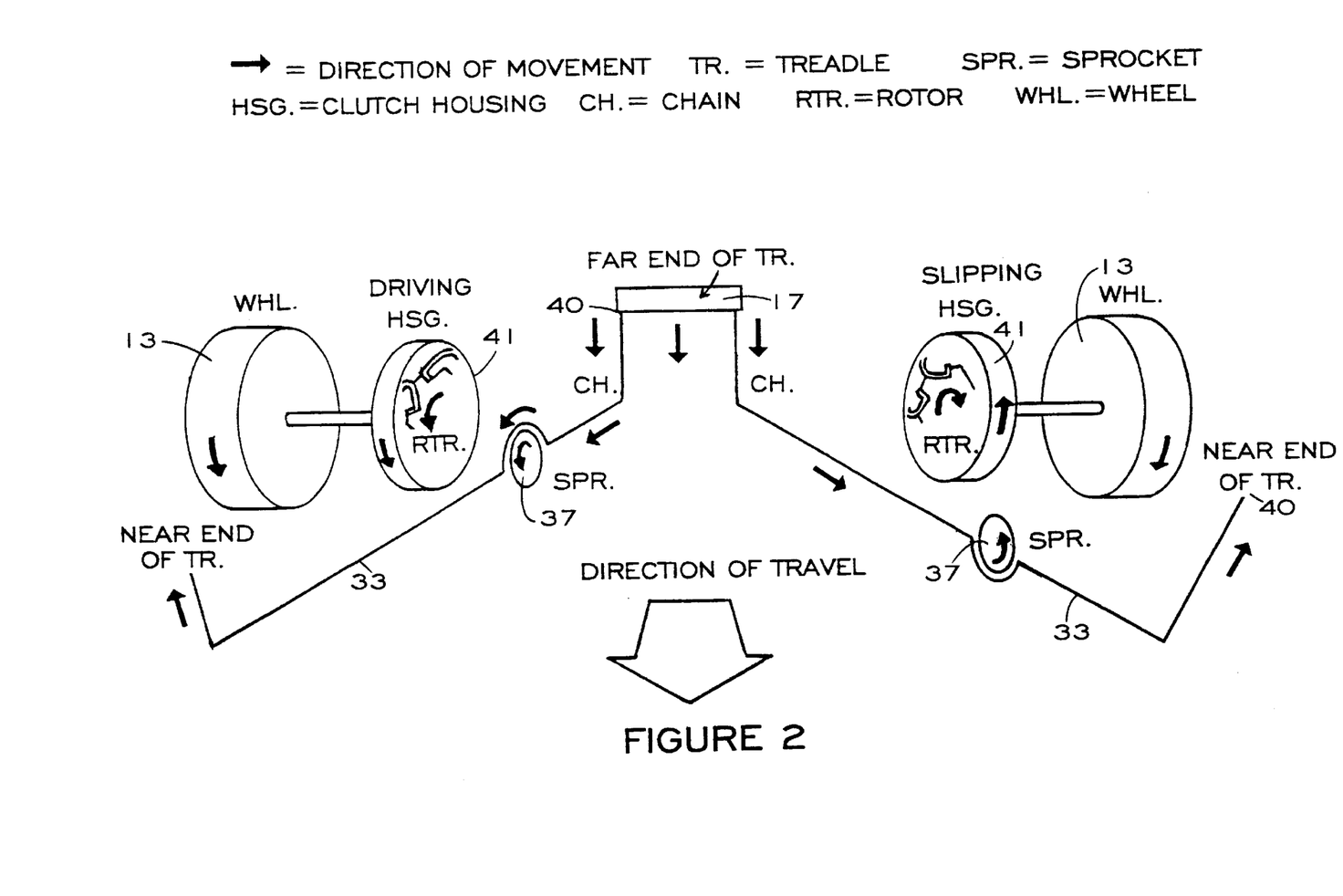
FIG. 2 is a simplified exploded view showing the drive means and one base wheel from each of the pairs of base wheels as well as both power wheels and both clutch units with the direction of rotation indicated.

In FIG. 1 the two pairs of idler wheels 35 direct each drive means 33 to rotate one of the pair of power wheels 37, each of which power one of the pair of drive trains. Each drive means 33 has its own power wheel 37. As best seen in FIG. 1 and FIG. 2, the power wheels 37, which are beneath opposite sides of the treadle board 17 are also located beneath and toward opposite ends 19 of the treadle board 17.

The four base wheels 13 shown in FIG. 1, being in contact with the ground, must always turn in the same direction. FIG. 2 provides the best understanding of the rotation of the various parts which transfer the power derived from the treadle board through the clutch units 41 to the base wheels 13 to propel the treadle cart. Both drive means 33 are always moving in the same direction but both power wheels 37 are rotating in opposite directions. As is seen in FIG. 2, one drive means 33 engages its power wheel 37 over the power wheel 37 or toward the treadle board 17 while the other drive means 33 engages the other power wheel 37 under the power wheel 37 or toward the ground. Since both of the drive means 33 are both moving in the same direction, the two power wheels, due to the area of contact with the drive means 33, must rotate in opposite directions. As will be subsequently explained in greater detail, each power train 39 transfers the power from its respective power wheel 37 to one of the clutch units 41 (FIG. 6) each clutch unit 41 including a clutch housing 45 and a clutch rotor 47. The clutch housings 45 are mounted on the frame 11 beneath opposite sides 21 of the treadle board 17 and turn in opposite directions but the clutch rotors 47 always turn in the same direction. Therefore, as one clutch housing 45 engages its clutch rotor 47, the other clutch rotor 47 slips within its clutch housing 45.

Referring now to FIG. 3 and to FIG. 4, one drive train 39 is shown. There are two drive trains 39, each being driven by a separate drive means and each drive train 39 is constructed in the same manner. The location of the power wheel 37, as has been previously explained, is the only notable difference between the two drive trains 39.

Still referring to FIG. 3 and FIG. 4, the movement of each drive means 33 turns its respective power wheel 37 which, in turn, actuates the drive train 39. The drive train 39 includes a series of wheels 49 which may be either gears or friction wheels and can even be replaced by belts or chains, but to assure positive power, gears are preferable. Each of the series wheels 49 in the drive train 39 are mounted to rotate on the frame 11 of the treadle cart.

Each drive train 39 and the series of wheels 49 therein, more specifically include a first wheel 51 which is mounted on the power wheel 37. The first wheel 51 is larger than the power wheel 37 resulting in a greater linear speed of the circumference of the first wheel 51. The first wheel 51 engages a second wheel 53 which is mounted on a third wheel 55. The third wheel 55 engages a fourth wheel 57 which in turn engages and turns a fifth wheel 59. The fifth wheel 59 drives a sixth wheel 61 which is mounted on a first drive shaft 63. The comparative size of the series of wheels 49 results in a substantial increase in rotational speed of the sixth wheel 61 in comparison to the power wheel 37. Also mounted on the first drive shaft 63 is a seventh wheel 65, which again is larger than the sixth wheel 61. The seventh wheel 65 turns an eighth wheel 67 which is smaller than the seventh wheel 65 so as further to increase the speed of rotation. Mounted on the eighth wheel 67 is the ninth wheel 69 which is larger than the eighth wheel 67. The ninth wheel 69 engages a tenth wheel 71 which is mounted on a second drive shaft 73. Also secured to the second drive shaft or the clutch housing shaft 73 is the clutch housing 45 which is part of the clutch unit 41. It should be noted that the second drive shaft 73 is a hollow drive shaft. The second drive shaft 73 rotates the clutch housing 75 in the direction of rotation of the tenth wheel 71.

Again referring to FIG. 2, as has been previously explained, all base wheels 13 are always rotating in the same direction along with all clutch rotors 47 but the power wheels 37 are rotating in opposite directions and the clutch housings 45 are rotating in opposite directions from one another. Each power wheel 37 and its respective clutch housing 45 rotate in the same direction.

Figure 6:
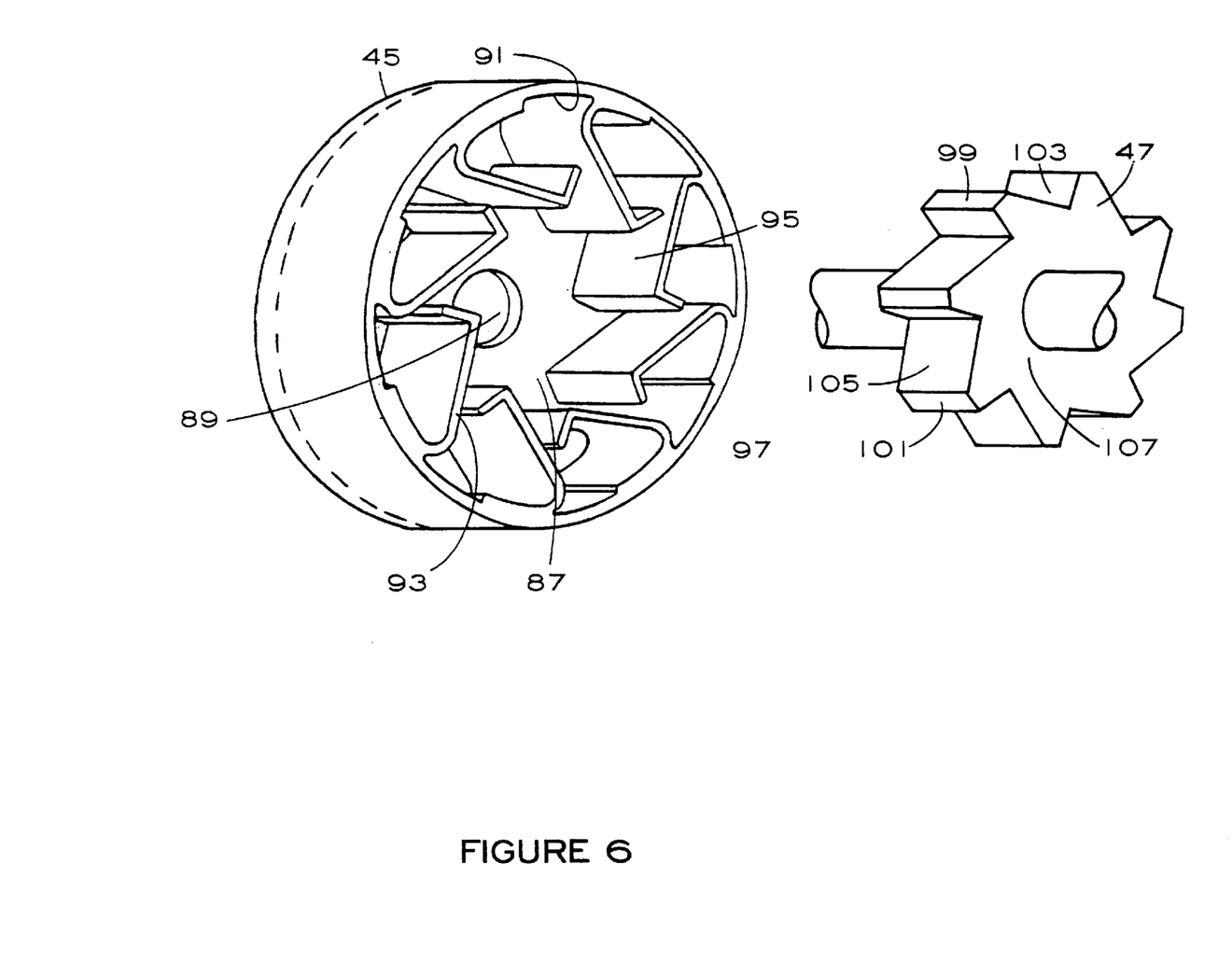
FIG. 6 is a pictorial exploded view of the clutch unit showing the clutch housing and the clutch rotor.

As seen is FIG. 6, mounted in the clutch housing 45 as part of the clutch unit 41 is the clutch rotor 47. As will be subsequently explained, the clutch housing 45 and the clutch rotor 47 engage when the clutch housing 45 is rotated in one direction but the clutch rotor 47 slips when the clutch housing 45 rotates in the opposite direction.

Figure 5:
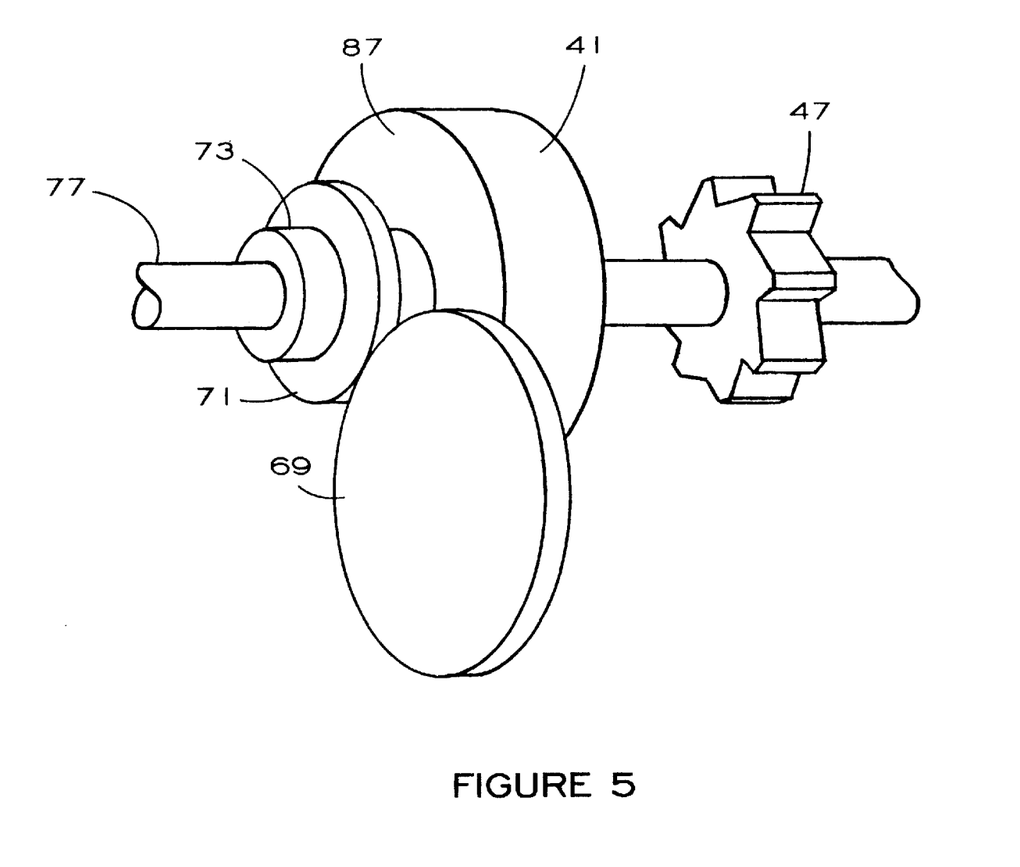
FIG. 5 is a pictorial view of a part of the drive train and the clutch unit with the clutch rotor extending out of the clutch housing.

As best seen in FIG. 5, the clutch rotor 47 is mounted on a third drive shaft or rotor shaft 77 which rotates within and independently of the second drive shaft 73 which, as has been previously stated, is hollow. The rotor shaft 77 has mounted on it both clutch rotors 47 as both clutch rotors 47 rotate in the same direction and at the same rate of rotation at all times. As seen in FIG. 3. the third drive shaft 77 is also secured to a main wheel 79 which drives a continuous member 81. The continuous member 81 is preferably a belt since in braking and steering, the continuous member 81 must slip. The continuous member 81 drives two secondary wheels 83, each of the two secondary wheels 83 is mounted on one of the pair of axles 15. A tension wheel 85, also mounted to rotate on the frame 11 engages the continuous member 81 to maintain tension in the continuous member 81 when the base wheels 13 are being powered and to relieve tension during braking and steering, as will be subsequently explained.

Figure 7:
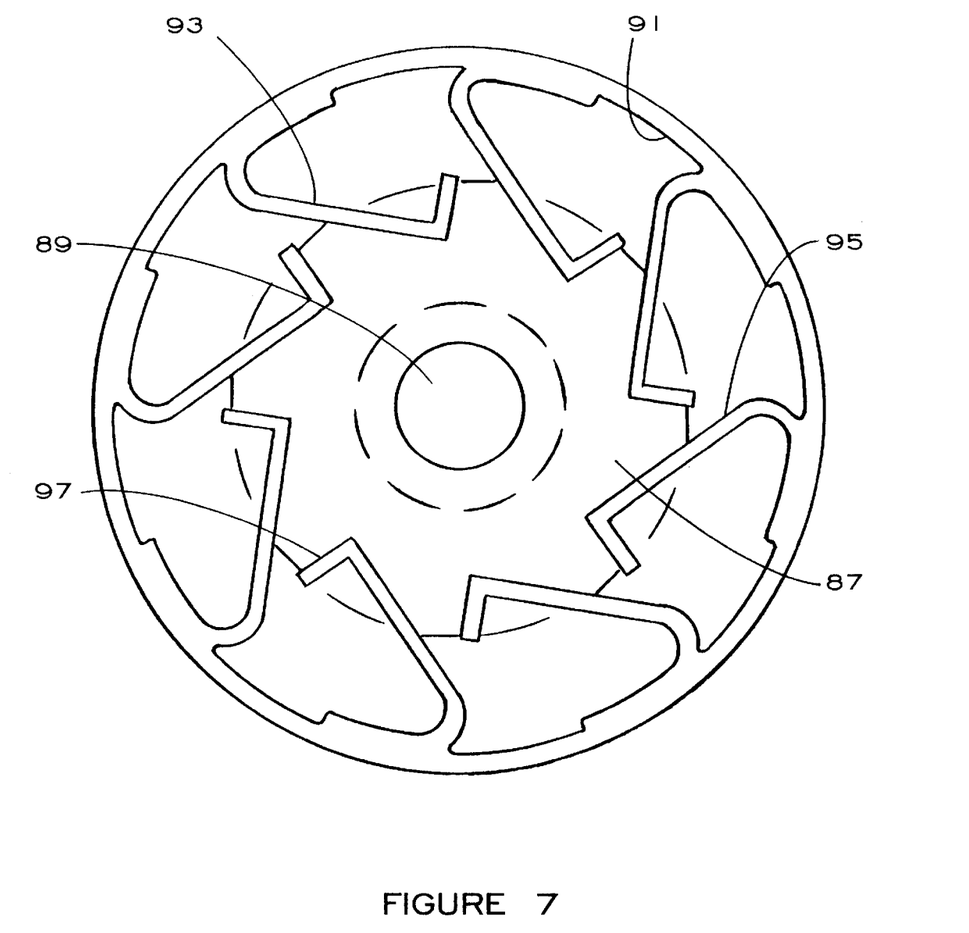
FIG. 7 is a side elevation of the clutch housing.

Referring now to FIG. 6 and FIG. 7, the clutch housing 45 and the clutch rotor 47 can be seen in greater detail. The clutch housing 45 is a cylindrical member with one circular surface having a cover 87 over it with a shaft opening 89 centrally located through the cover 87. Extending from the inner circumference surface 91 of the clutch housing 45 is a series of tines 93. Each tine 93 has two sections, namely a main section 95 and an extension section 97. The main section 95 extends from the inner circumference surface 91. The extension section 97 turns back toward the inner circumference surface 91 at an angle that is substantially at right angles to the main section 95. The extension section 97 is substantially shorter than the main section 95.

Still referring to FIG. 6, the clutch rotor 47 is a gear with large non symmetrical teeth 99. Each one of the teeth 99 has a blunt end 101 and a short side 103 and a long side 105. The short side 103 extends generally at a right angle to the blunt end 101 from the inner area 107 of the clutch rotor 47 while the long side 105, which is substantially longer than the short side 103, is generally tangential to the inner area 107 of the clutch rotor 47.

Each short side 103 engages one of the extension sections 97 of one of the tines 93 and creates a firm drive. When the clutch housing 45 turns so as to press the extension section 97 against the short side 103, a drive condition exists. When the clutch housing 45 is rotated in the opposite direction, the long side 105 presses against the main section 95, thereby pressing the tine 93 into the inner circumference surface 91 of the clutch housing 45 and the clutch rotor 47 slips in the clutch housing 45.

Figure 8:
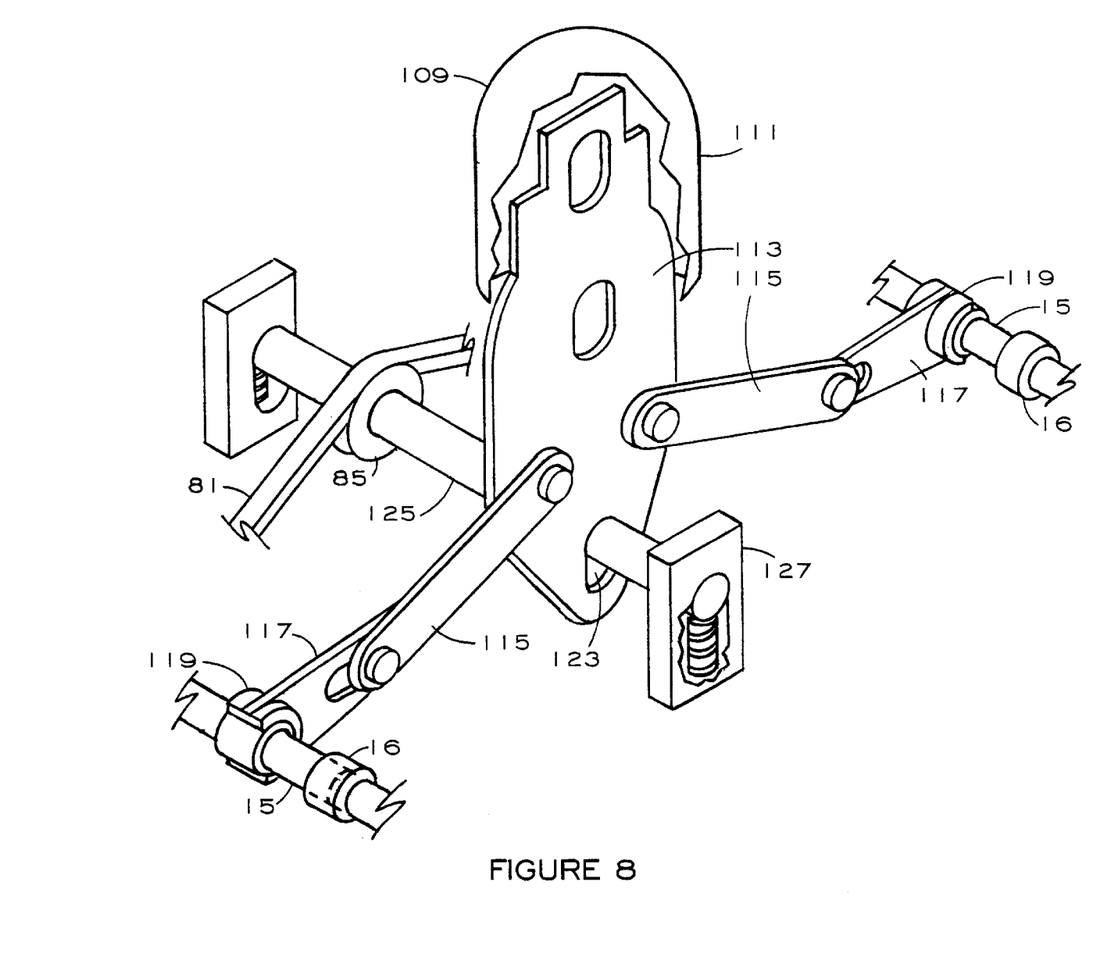
FIG. 8 is a pictorial view of one of the pair of brake and steering mechanisms.

In FIG. 1 there is shown a pair of brake pedals 109 mounted on the frame 11 but extending through and free of the treadle board 17. The brake mechanism 111 is shown is FIG. 8 and two such brake mechanisms 111 exist as can be seen in FIG. 1. Each brake mechanism 111 is mounted through and beneath opposite sides of the treadle board 17 as can be seen in FIG. 4. In FIG. 8, each brake pedal 109, where the operator's foot is placed to actuate the brake mechanism 111, is at the top of the brake mechanism 111. Each brake pedal 109 is mounted on ;a brake plate 113 which is irregularly shaped. Two sets of inside levers 115 and outside levers 117 are connected to one another so as to pivot as to one another. Each set of inside levers 115 and outside levers 117 are mounted on opposite sides of the brake plate 113. Each inside lever 115 is connected to pivot on the brake plate 113. When the brake plate 113 is in its upward position or, in other words, is not being depressed by the operator, each inside lever 115 and each outside lever 117 are at a slight angle to one another but as the brake plate 113 is depressed, the inside lever 115 and the outside lever 117 become aligned with one another and thus with the brake pedal 109 depressed, each outside lever 117 extends further from the brake plate 113 due to the elimination of the slight angle between the inside lever 115 and the outside lever 117.

Mounted on the outside end of each of the outside levers 117 is a U-shaped member 119. Mounted on the axle 15 adjacent the U-shaped member 119 is a brake pad 121. Each of the U-shaped members 119 presses against an axle 15 and, since there are two axles 15, both are contacted by each of the two brake mechanisms 111.

At the lower end of each brake plate 113 is an elongated opening 123. Each tension wheel 85 is mounted on a tension shaft 125 which passes through the elongated opening 123. The tension shaft 125 is mounted at both ends in spring loaded journals 127 and as the brake mechanism 111 is depressed, the tension shaft 125 is depressed and the tension wheel 85 is also depressed relieving the tension in the continuous member 81. In this way, when a brake pedal 109 is pressed down by the operator, the rotation of the base wheels 13 is impaired by the brake pads 121 and the application of power to the secondary wheels 83 through the continuous member 81 is released.

The brake mechanisms 111 are also used to steer the treadle cart. When one brake pedal 109 is partially depressed and the other brake pedal 109 is not depressed, the treadle cart will turn in the direction of the side 21 on which the brake pad 109 being depressed is located.

Due to the axles 15 being split, only the part of the axle where the brake pedal 109 being depressed is located is impeded and only that respective continuous member 81 is released. By pressing down hard on both brake pedals 109 together, braking occurs rather than steering.

Thus, while a preferred embodiment of the invention has been shown and described, it will be apparent to those skilled in the art that many other changes and modifications may be made without departing from the invention in its broader aspects. The appended claims are therefore intended to cover all such changes and modifications as fall within the true spirit and scope of the invention.

We claim:

1. A treadle cart powered by the rocking motion of a rider, such treadle cart comprising:

a frame;

a pair of axles mounted on the frame;

four base wheels, two base wheels being mounted to rotate on each one of the pair of axles;

a treadle board, having a top surface and an under surface and having two ends and two sides, the sides being substantially longer than the ends and being generally at right angles to the ends, the treadle board being mounted midway between the two ends to pivot on the frame;

a pair of drive means, each drive means being a flexible elongated member and having two ends, each drive means being connected at each of its two ends to the under surface of the treadle board adjacent opposite ends of the treadle board and each being adjacent opposite sides of the treadle board;

two pairs of idler wheels, each pair of idler wheels being located beneath opposite sides of the treadle board, each drive means engaging a separate pair of idler wheels;

two power wheels, each power wheel being mounted to rotate on the frame and being located in line with and between a separate pair of idler wheels one power wheel being located closer to one end of the treadle board and the other power wheel being located closer to the other end of the treadle board, each power wheel engaging one drive means;

a pair of clutch housings including a cylindrical member having an inner circumference surface;

tines mounted along the inner circumference surface of the cylindrical member, each tine having a main section and an extension section, the main section extending from the inner circumference surface;

a clutch rotor having a series of large non symmetrical teeth, each one of the teeth having a blunt end and a short side and a long side, the short side extending generally at right angles to the blunt end and the long side being generally tangential to the clutch rotor, the clutch rotor being mounted in the clutch housing, the clutch rotor being held in the clutch housing by the extension section being pressed against the short side when the clutch housing rotates in one direction and the clutch rotor slipping in the clutch housing when the main section presses against the long side when the clutch housing rotates in the opposite direction;

a pair of drive trains, each drive train including a series of wheels for transmitting power from each power wheel to one of the, clutch housings, each drive train including a housing shaft on which the clutch housing is mounted, the housing shaft being hollow;

a rotor shaft on which the pair of clutch rotors is mounted, the rotor shaft being mounted in both pairs of clutch housing shafts;

a pair of main wheels, each main wheel being mounted on one of the pair of rotor shafts;

two pairs of secondary wheels, one wheel of each pair of secondary wheels being mounted on one of the pair of axles;

a pair of continuous members, each continuous member being a flexible loop mounted on one of the pair of main wheels and one pair of the two pairs of secondary wheels; and a pair of brake mechanisms mounted on the frame, each pair of brake mechanisms including a pair of brake pads that engage the pair of axles.

2. A treadle cart according to claim 1 wherein each brake mechanism includes the following:

a brake plate;

a brake pedal mounted on the brake plate;

two sets of inside levers and outside levers connected to one another so as to pivot as to one another, each inside lever being mounted on the brake plate; and a pair of U-shaped members, one U-shaped member being mounted on one outside lever, the brake pads being mounted in the U-shaped members.

3. A treadle cart powered by the rocking motion of a rider, such treadle cart comprising:

a frame;

a pair of axles mounted on the frame;

four base wheels, two base wheels being mounted to rotate on each one of the pair of axles;

a treadle board, having a top surface and an under surface and having two ends and two sides, the sides being substantially longer than the ends, the treadle board being mounted generally midway between the two ends to pivot on the frame;

a pair of drive means, each drive means being a flexible elongated member and having two ends, each drive means being connected at each of its two ends to the under surface of the treadle board;

two power wheels, each power wheel being mounted to rotate on the frame, one power wheel being located closer to one end of the treadle board and the other power wheel being located closer to the other end of the treadle board;

a pair of clutch housings;

a clutch rotor mounted in the clutch housing, the clutch housing including means for locking the clutch rotor to the clutch housing when the clutch housing rotates in one direction and to permit the clutch rotor to slip in the clutch housing when the clutch housing is rotated in the opposite direction;

a pair of drive trains, each drive train including means for transmitting power from one power wheel to one of the clutch housings, each drive train including a housing shaft on which the clutch housing is mounted, the housing shaft being hollow;

a rotor shaft on which the pair of clutch rotors are mounted, the rotor shaft being mounted in both clutch housing shafts;

a pair of main wheels, each main wheel being mounted on one of the pair of rotor shafts;

two pairs of secondary wheels, one wheel of each pair of secondary wheels being mounted on one of the pair of axles; and a pair of continuous members, each continuous member being a flexible loop mounted on one of the pair of main wheels and one pair of the two pairs of secondary wheels.

4. A treadle cart according to claim 3 further including:

two pairs of idler wheels, each pair of idler wheels being located beneath opposite sides of the treadle board and one pair of idler wheels being located beneath opposite ends of the treadle board, each drive means engaging a separate pair of idler wheels.

5. A treadle cart according to claim 3 further including:

two pairs of idler wheels, each drive means engaging a separate pair of idler wheels, each power wheel being located in line with and between a separate pair of idler wheels.

6. A treadle cart according to claim 3 wherein:

each clutch housing includes a cylindrical member having an inner cylindrical surface and further including tines mounted along the inner circumference surface of the cylindrical member, each tine having a main section and an extension section, the main section extending from the inner circumference surface; and each clutch rotor includes a series of large non symmetrical teeth, each one of the teeth having a blunt end and a short side and a long side.

7. A treadle cart according to claim 3 wherein:

each drive train includes a series of wheels.

8. A treadle cart according to claim 3 further including a pair of brake mechanisms mounted on the frame, each pair of brake mechanisms including a pair of brake pads that engage the pair of axles.

9. A treadle cart powered by the rocking motion of a rider, such treadle cart comprising:

a frame;

a pair of axles mounted on the frame;

four base wheels, two base wheels being mounted to rotate on each one of the pair of axles;

a treadle board, having a top surface, the treadle board being mounted to pivot on the frame;

a pair of drive means, each drive means being a flexible elongated member and having two ends, each drive means being connected at each of its two ends to the treadle board;

a pair of clutch units including a clutch and a clutch rotor, the clutch rotor being held by the clutch housing when the clutch housing rotates in one direction and the clutch rotor slipping when the clutch housing rotates in the opposite direction;

means for transmitting power from each drive means to one of the clutch housings, each drive train including a housing shaft on which the clutch housing is mounted;

to a rotor shaft, the clutch rotors being mounted on the rotor shaft; and means for transmitting power from the rotor shaft to the pair of axles to rotate the four base wheels wherein the means for transmitting power from the pair of rotor shafts to the pair of axles includes:

a pair of main wheels, each main wheel of the pair of main wheels being mounted on one of the pair of rotor shafts;

two pairs of secondary wheels, one wheel of each pair of secondary wheels being mounted on one of the pair of axles; and a pair of continuous members, each continuous member being a flexible loop mounted on one of main wheels and one pair of the two pairs of secondary wheels.

10. A treadle cart according to claim 9 further including:

two pairs of idler wheels, each pair of idler wheels being located beneath opposite sides of the treadle board and one pair of idler wheels being located beneath opposite ends of the treadle board, each drive means engaging a separate pair of idler wheels.

11. A treadle cart according to claim 9 further including:

two pairs of idler wheels, each drive means engaging a separate pair of idler wheels, each power wheel being located in line with and between a separate pair of idler wheels.

12. A treadle cart according to claim 9 wherein:

each clutch housing includes a cylindrical member having an inner cylindrical surface and further including tines mounted along the inner circumference surface of the cylindrical member, each tine having a main section and an extension section, the main section extending from the inner circumference surface; and each clutch rotor includes a series of large non symmetrical teeth, each one of the teeth having a blunt end and a short side and a long side.

13. A treadle cart according to claim 9 wherein:

each drive means includes a series of wheels.

14. A treadle cart according to claim 9 further including a pair of brake mechanisms mounted on the frame, each pair of brake mechanisms including a pair of brake pads that engage the pair of axles.

* * * * *